US012309238B2

United States Patent
Bhat et al.

(10) Patent No.: US 12,309,238 B2
(45) Date of Patent: May 20, 2025

(54) APPLICATION HEALTH MONITORING

(71) Applicant: ServiceNow, Inc., Santa Clara, CA (US)

(72) Inventors: Ganesh Parameshwar Bhat, Bangalore (IN); Venkata Phani Kumar Gudladona, Bangalore (IN); Harsha Vijayakumar, Milpitas, CA (US); Pooja I. Halemani, Hubli (IN); Sreenevas Subramaniam, Dublin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/136,802

(22) Filed: Apr. 19, 2023

(65) Prior Publication Data

US 2024/0357017 A1    Oct. 24, 2024

(51) Int. Cl.
    *H04L 67/50*      (2022.01)
    *G06F 11/36*      (2006.01)
    *G06F 11/3604*    (2025.01)
    *H04L 67/75*      (2022.01)

(52) U.S. Cl.
    CPC ........ *H04L 67/535* (2022.05); *G06F 11/3604* (2013.01); *H04L 67/75* (2022.05)

(58) Field of Classification Search
    CPC ..... H04L 67/535; H04L 67/75; G06F 11/3604
    See application file for complete search history.

(56) References Cited

U.S. PATENT DOCUMENTS

| | | | |
|---|---|---|---|
| 7,117,531 B2 | 10/2006 | Fukasawa | |
| 11,695,834 B1* | 7/2023 | Aggarwal | H04L 67/12 709/217 |
| 2008/0247320 A1* | 10/2008 | Grah | H04L 41/5012 370/241 |
| 2012/0054625 A1 | 3/2012 | Pugh et al. | |
| 2014/0215495 A1* | 7/2014 | Erich | G06F 11/3438 719/318 |
| 2018/0314576 A1 | 11/2018 | Pasupuleti | |

(Continued)

FOREIGN PATENT DOCUMENTS

| | | |
|---|---|---|
| JP | 2002358216 A | 12/2002 |
| JP | 2009237995 A | 10/2009 |
| JP | 2011070245 A | 4/2011 |

OTHER PUBLICATIONS

Huiming Yu, Jin Zhang and Jinsheng Xu, "Multi-Agent Testing Architecture for Monitoring and Analyzing the Performance of Web Applications," IEEE/ACIS International Conference on Computer and Information Science (ICIS-COMSAR'06), Honolulu, HI, 2006, pp. 115-120, doi: 10.1109/ICIS-COMSAR.2006.63. (Year: 2006).*

(Continued)

*Primary Examiner* — Rachel J Hackenberg
(74) *Attorney, Agent, or Firm* — FLETCHER YODER PC

(57) ABSTRACT

A communication channel with an agent installed on a client is activated. While the communication channel is active, usage data is collected via the agent, wherein the usage data characterizes usage regarding a plurality of different applications accessed via the client. The usage data is analyzed to determine metrics associated with the plurality of different applications. An interactive user interface dashboard providing the determined metrics is provided.

20 Claims, 11 Drawing Sheets

(56) References Cited

U.S. PATENT DOCUMENTS

| | | | |
|---|---|---|---|
| 2021/0152455 A1* | 5/2021 | Castle | H04L 43/0876 |
| 2022/0027431 A1 | 1/2022 | Khaled et al. | |
| 2023/0090108 A1* | 3/2023 | Ciabarra, Jr. | H04L 67/535 |
| | | | 726/26 |
| 2023/0254330 A1* | 8/2023 | Singh | G06F 21/57 |
| | | | 726/23 |

OTHER PUBLICATIONS

H. Lokawati and Y. Widyani, "Monitoring System of Multi-Tenant Software as a Service (SaaS)," 2019 International Conference on Data and Software Engineering (ICoDSE), Pontianak, Indonesia, 2019, pp. 1-5, doi: 10.1109/ICoDSE48700.2019.9092741. (Year: 2019).*

Examination Report for Australian Patent Application No. 2024200933 dated Dec. 18, 2024; 6 pgs.

* cited by examiner

APPLICATION HEALTH MONITORING

BACKGROUND OF THE INVENTION

Organizations collect usage information regarding software applications deployed within the organization. The collected usage information can include application performance and availability metrics for different types of applications including desktop and Software-as-a-Service (SaaS) applications. Typically, the usage information is provided by the application vendor and/or collected via user feedback and surveys. An organization may then rely on the information when evaluating the costs and benefits of the application to the organization. For example, the usage information can be a factor in determining whether to continue purchasing an application, to make the application more widely available to additional users within the organization, or to migrate to a different application.

BRIEF DESCRIPTION OF THE DRAWINGS

Various embodiments of the invention are disclosed in the following detailed description and the accompanying drawings.

DETAILED DESCRIPTION

Figure 1:
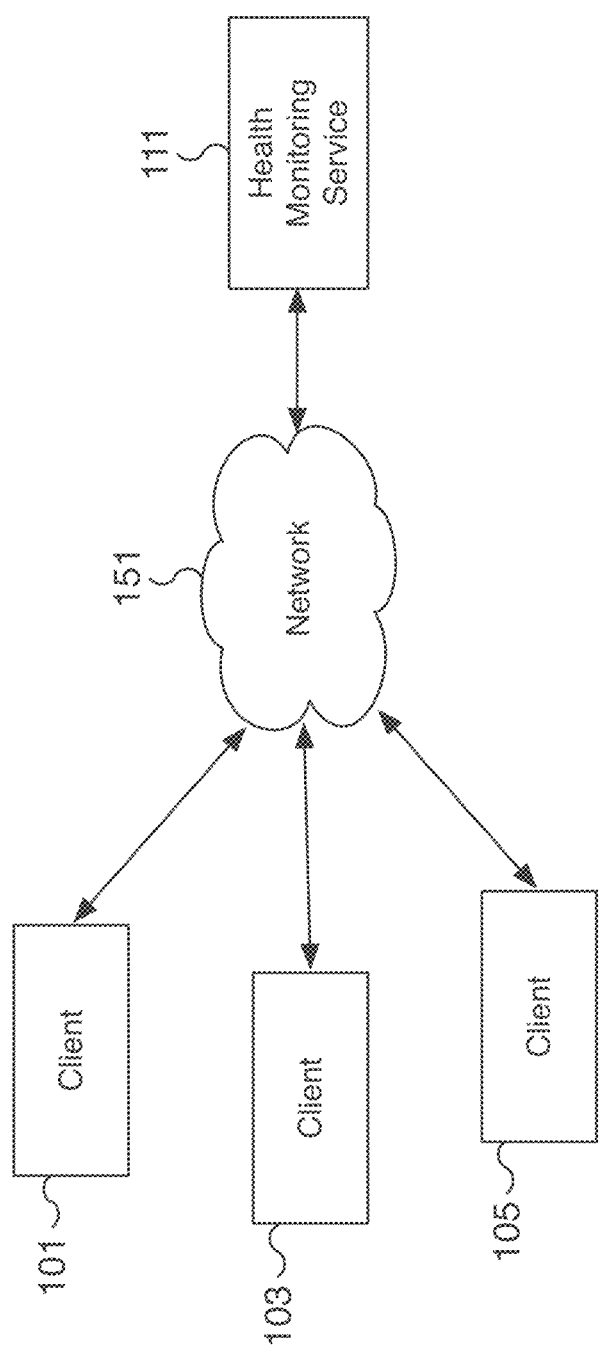
FIG. 1 is a block diagram illustrating an embodiment of a platform for an application health monitor service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Application health monitoring is disclosed. For example, an application health monitoring service platform monitors client application usage and provides metrics related to application health via a cloud-based application health monitoring service. In some embodiments, client devices are configured with an agent for monitoring applications and collecting usage data such as application uptime, crashes, activity, resource usage, and user usage, among other usage data. Cloud-based applications including Software-as-a-Service (SaaS) applications can be monitored using the configured agent and/or via a configured browser extension. For example, a browser extension can be installed on client devices to monitor and collect usage data for web-based applications. In various embodiments, the applications monitored are based on a inclusion list configured by an information technology team managing the devices. The collected usage data is provided by the agents installed on client devices to the application health monitoring service, where the application health monitoring service can analyze the data including aggregating and auditing the usage data to provide corresponding usage metrics. In various embodiments, the determined metrics are provided for inspection via an interactive user interface dashboard. For example, an IT operations team can access the determined metrics via a web-based interface of the cloud-based application health monitoring service. In various embodiments, among other metrics, the analyzed metrics include auditing data on license usage, allowing an organization to optimize their purchase and usage of paid licenses. Similarly, the analyzed metrics can include uptime metrics that allow an organization to validate guaranteed uptime agreements provided by application vendors. In some embodiments, the application health monitoring service provides auditing and/or license usage including reclamation and purchase requests to Software Asset Management (SAM) platforms, for example, to initiate the refund of unused licenses or to purchase additional licenses.

In some embodiments, a communication channel with an agent installed on a client is activated. For example, a communication channel between an application health monitoring service and an agent installed and running on a client device is activated. The client device can be a computing device used for running applications including both desktop applications and cloud-service or Software-as-a-Service (SaaS) applications. In some embodiments, a browser extension is installed on the client device and is configured to monitor cloud-based applications accessed via a web browser and the agent installed on the client device is configured to monitor desktop and Internet applications. In some embodiments, while the communication channel is active, usage data is collected via the agent, wherein the usage data characterizes usage regarding a plurality of different applications accessed via the client. For example, the installed agent and/or browser extension monitors and collects usage data for different applications accessed via the client. The collected usage data is provided by the agent over the established communication channel. For example, the usage data is provided from the agent to the application health monitoring service.

In some embodiments, the usage data is analyzed to determine metrics associated with the plurality of different applications. For example, the application health monitoring service analyzes the received usage data regarding the plurality of different applications accessed via the client. In some embodiments, an interactive user interface dashboard is provided that provides the determined metrics. For example, a web-based health monitoring application is provided by the application health monitoring service to view and interact with the determined metrics associated with the plurality of different applications. In various embodiments, the usage data analyzed and associated metrics can include usage data for the plurality of different applications across multiple clients. For example, the application health monitoring service can receive and analyze usage data from a variety of clients configured for application monitoring. The analysis performed by the application health monitoring service can include determining metrics associated with auditing the usage of licensed applications such as auditing and providing a report on the uptime of applications and/or the usage pattern for licenses associated with the monitored applications.

FIG. 1 is a block diagram illustrating an embodiment of a platform for an application health monitor service. In the example shown, clients 101, 103, and 105 are network clients configured with an application health monitoring agent. Clients 101, 103, and 105 are communicatively connected to application health monitoring service 111 via network 151. Network 151 can be a public or private network. In some embodiments, network 151 is a public network such as the Internet. Application health monitoring service 111 provides a cloud-based service to inspect usage metrics associated with clients 101, 103, and 105. For example, in some embodiments, application health monitoring service 111 provides an interactive user interface dashboard for inspective application usage metrics.

In some embodiments, clients 101, 103, and 105 are each a network client device for running applications such as desktop applications and cloud or web-based applications including Software-as-a-Service (SaaS) applications. Each of clients 101, 103, and 105 is configured with an application health monitoring agent (not shown) that collects and provides usage data of monitored applications to application health monitoring service 111. For example, a communication channel can be established between application health monitoring service 111 and each of clients 101, 103, and 105 to provide collected usage data. In some embodiments, the communication channel is established between application health monitoring service 111 and the corresponding application health monitoring agent installed on each of clients 101, 103, and 105.

In some embodiments, each of clients 101, 103, and 105 is configured with a browser extension or plug-in (not shown) for monitoring web-based applications accessed via a web browser. The configured browser extension can monitor and collect usage data associated with applications accessed via the associated web browser. For example, SaaS application usage data can be collected by the browser extension when a SaaS application is accessed via the associated web browser. In various embodiments, the collected usage data is provided by the browser extension to the application health monitoring agent of the same client device. The application health monitoring agent then provides collected usage data to application health monitoring service 111. In some embodiments, the application health monitoring agent is implemented as a browser extension. In some embodiments, the application health monitoring agent is implemented as a stand-alone application such as an agent daemon or service running on a client device and the agent communicates with the browser extension to collect and forward browser-based application usage data to application health monitoring service 111. Although described as an application health monitoring agent, in various embodiments, the actual implementation of the agent can be as a multipurpose monitoring agent with ability to monitor application health among other metrics, activities, features, functionality, capabilities, data, etc.

In some embodiments, the services provided by application health monitoring service 111 are accessed by users of network clients such as clients 101, 103, and 105. For example, an IT administrator via network clients such as clients 101, 103, and 105 can configure clients for application monitoring. As another example, an IT administrator via network clients such as clients 101, 103, and 105 can access a dashboard to review and interact with application usage metrics provided by application health monitoring service 111. In some embodiments, the dashboard is accessed via a web browser and the interactive user interface dashboard is provided at least in part by application health monitoring service 111. In some embodiments, the dashboard is accessible via a custom application based on usage metrics provided by application health monitoring service 111. For example, a custom application can include a system tray application, a chat bot application, and/or a cloud-based desktop application, among others for interacting with usage metrics provided by application health monitoring service 111.

In some embodiments, application health monitoring service 111 is a cloud server that offers application health monitoring cloud services. The provided application health monitoring services can include the ability to configure and manage application monitoring on clients such as clients 101, 103, and 105 as well as the ability to receive and analyze the collected application usage data. For example, application health monitoring service 111 can collect application usage data from clients 101, 103, and 105 for analysis. The analyzed usage data can be provided as usage metrics via an interactive user interface dashboard. In some embodiments, the analysis is provided to one or more Software Asset Management (SAM) platforms to initiate actions based on identified application usage, such as the identified underutilization of paid licenses or application uptime metrics that do not meet application uptime guarantees. In various embodiments, the application usage metrics can include aggregated results including daily, weekly, month, and/or other results based on a different configured time frame as well as location dependent results such as results for particular regions and/or computer network locations.

Although single instances of some components have been shown to simplify the diagram of FIG. 1, additional instances of any of the components shown in FIG. 1 may exist. For example, application health monitoring service 111 may include one or more cloud servers and one or more databases utilized by the cloud servers. Additionally, clients 101, 103, and 105 are example client devices for client application monitoring and/or the administration of application monitoring. In some scenarios, each of clients 101, 103, and 105 may only function as a client for client application monitoring or as a client for the administration of application monitoring (via application health monitoring service 111) but not both. Although three clients are shown (clients 101, 103, and 105), many more additional clients can exist and communicate with and/or be managed from application health monitoring service 111. In some embodiments, components not shown in FIG. 1 may also exist.

Figure 2:
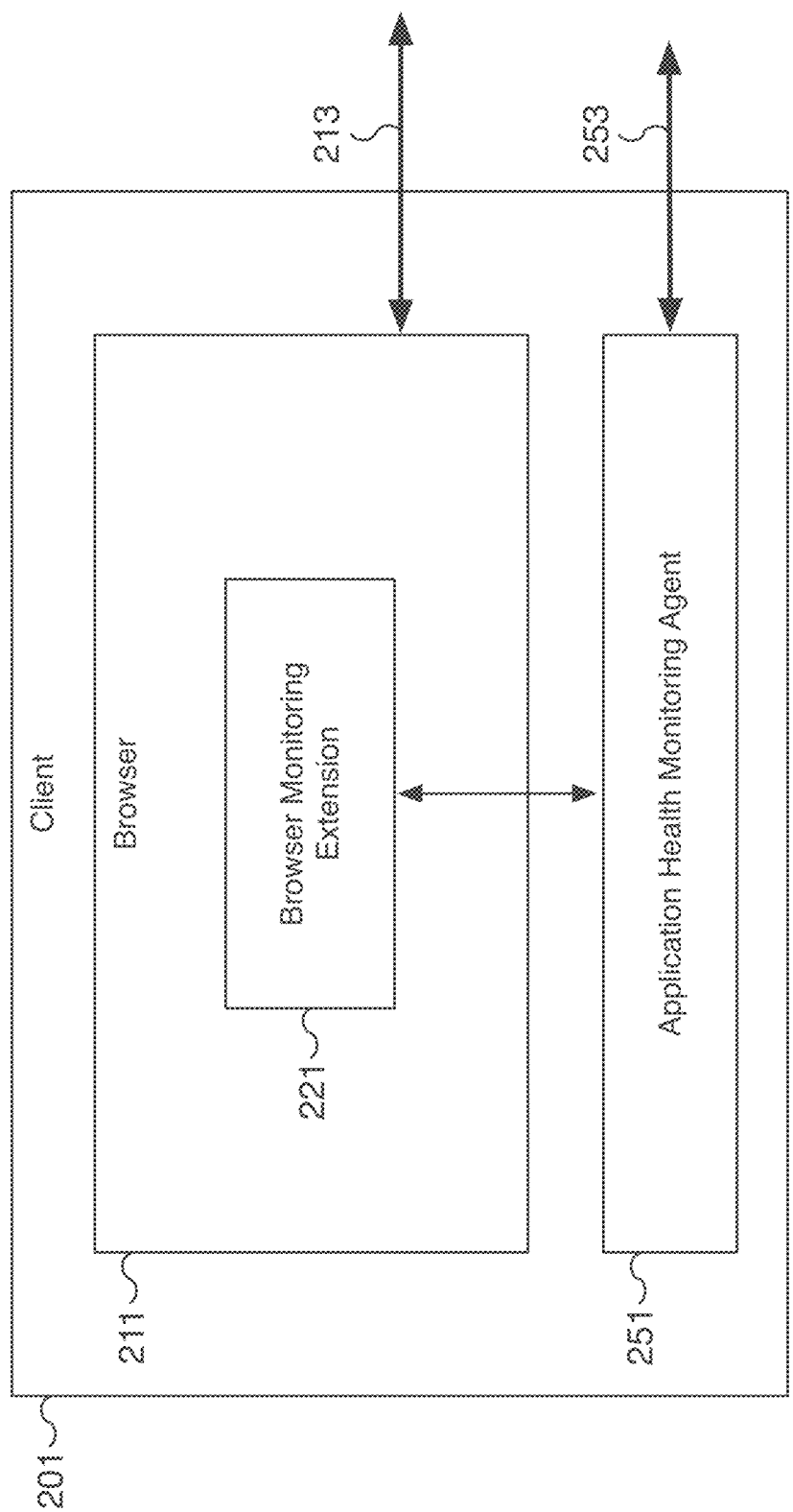
FIG. 2 is a block diagram illustrating an embodiment of a client device configured for application monitoring.

FIG. 2 is a block diagram illustrating an embodiment of a client device configured for application monitoring. In the example shown, client 201 is a network client and includes browser 211 and application health monitoring agent 251. Browser 211 and application health monitoring agent 251 establish network connections 213 and 253, respectively. In various embodiments, application health monitoring agent 251 is an application such as an operating system application and is configured as an agent for monitoring client 201. Although configured with the ability to monitor the application health of client 201, in various embodiments, the actual implementation of application health monitoring agent 251 can be as a multipurpose monitoring agent with ability to monitor application health among other metrics, activities, features, functionality, capabilities, data, etc. Network connection 213 is utilized by browser 211 to access browser-based applications such as cloud or web-based applications including Software-as-a-Service (SaaS) applications. Browser 211 includes browser monitoring extension 221 for monitoring usage of application access via browser 211. Browser monitoring extension 221 is communicatively connected to application health monitoring agent 251, for example, to provide collected browser usage data. In addition to monitoring client 201, application health monitoring agent 251 utilizes network connection 253 to provide collected usage, including usage data collected via browser monitoring extension 221, to a cloud-based application health monitoring service. In various embodiments, application health monitoring of client 201 including the configuration of browser monitoring extension 221 and/or application health monitoring agent 251 can be configured remotely via network connections 213 and 253. In some embodiments, the cloud-based application health monitoring service is application health monitoring service 111 of FIG. 1 and client 201 is client 101, 103, and/or 105 of FIG. 1.

In some embodiments, client 201 is a network client such as a desktop computer, a laptop, a mobile device, a tablet, a kiosk, a voice assistant, a wearable device, or another network computing device. Client 201 may be managed by an IT operations group and can be configured for accessing applications including applications approved by the IT operations group. Users of client 201 may execute and run applications using client 201 including local applications and/or web-based applications. For example, applications utilized by users of client 201 can include applications installed on client 201 as well as applications accessed via browser 211. Client 201 is configured for application health monitoring by installing on client 201 application health monitoring agent 251 and/or browser monitoring extension 221. In some embodiments, client 201 can be configured for application health monitoring via application health monitoring agent 251 and network connection 253.

In some embodiments, browser 211 is a web browser installed on client 201 and browser 211 is configured with browser monitoring extension 221. Browser monitoring extension 221 is a web browser extension and/or plug-in for monitoring the usage of browser 211. In some embodiments, unlike application health monitoring agent 251, browser monitoring extension 221 is configured with permissions that allow for the collection and monitoring of usage data specific and/or local to browser 211. For example, usage data associated with accessing a SaaS application via browser 211 can be collected by browser monitoring extension 221. In various embodiments, usage data collected by browser monitoring extension 221 can include data related to application availability, response time, usage time including total usage time, DNS lookup time, failed request data, total session time, page views, load times including page load times, response times, and access times including last access time, among other usage and operations data. In some embodiments, browser monitoring extension 221 is configured with a list of web applications to monitor, such as via a list of web sites, domains, and/or application names, and only the configured applications have their associated usage data collected. In various embodiments, the collected usage data is provided to application health monitoring agent 251, for example, as a means of providing the collected browser-based usage data to an application health monitoring service. In some embodiments, browser 211 utilizes a network connection such as network connection 213 to access network resources such as web application data. In some embodiments, browser monitoring extension 221 is configured via application health monitoring agent 251, one or more network connections such as network connections 213 and/or 253, and/or via another remote configuration interface.

In some embodiments, application health monitoring agent 251 is an agent application installed on client 201. Application health monitoring agent 251 can be configured for monitoring applications and for communicating with browser monitoring extension 221. In various embodiments, application health monitoring agent 251 is further configured to communicate with a cloud-based application health monitoring service via network connection 253. In the example shown, application health monitoring agent 251 monitors and collects usage data associated with client 201 and applications run on client 201. For example, application health monitoring agent 251 can collect usage data related to network transfers including incoming and/or outgoing network bytes, CPU usage, memory usage, crashes, error events, restarts, application configurations including versions, applications installed and/or running, application updates, usage including usage based on particular metrics such as by day, version, user, etc., and/or access data including last access time and total access time, among other usage and operations metrics. In some embodiments, application health monitoring agent 251 collects client metrics related to application usage include metrics related to CPU usage, memory usage, uptime, system time, disk or storage input/output usage, antivirus functionality, operating system errors and counts, battery health, disk or storage capacity, pending updates, application crashes, and/or triggering events such as software, network, and/or hardware events, among other usage and operations metrics.

Figure 3:
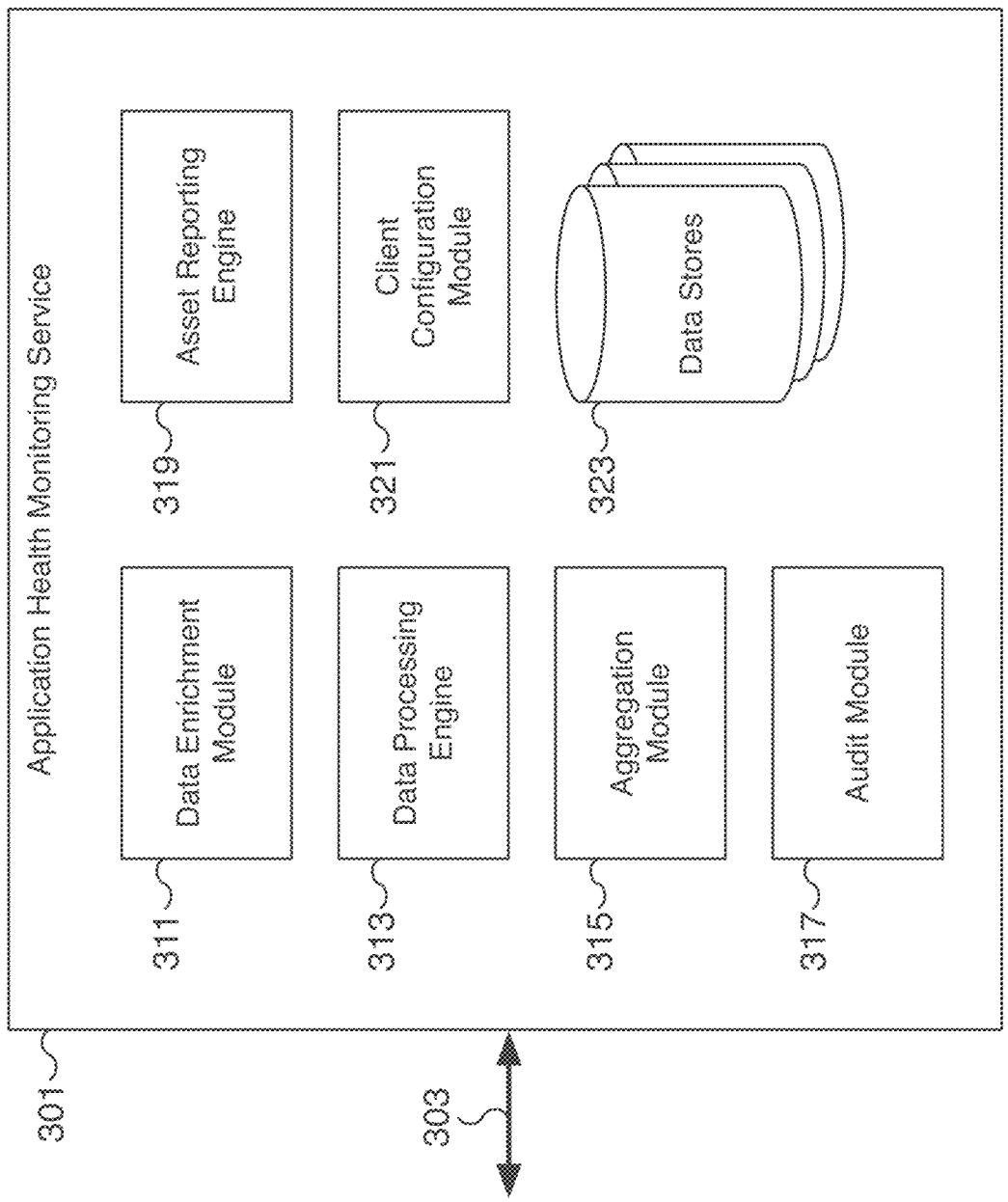
FIG. 3 is a block diagram illustrating an embodiment of an application health monitoring service.

FIG. 3 is a block diagram illustrating an embodiment of an application health monitoring service. In the example shown, application health monitoring service 301 is a cloud-based service for managing the health of applications utilized by remote clients. Application health monitoring service 301 communicates with remote clients via network connection 303 and includes multiple processing modules including data enrichment module 311, data processing engine 313, aggregation module 315, audit module 317, asset reporting engine 319, and client configuration module 321. In various embodiments, application health monitoring service 301 utilizes one or more data stores such as data stores 323. In some embodiments, application health monitoring service 301 is application health monitoring service 111 of FIG. 1 and/or the application health monitoring service used to remotely manage and communicate with client 101, 103, and/or 105 of FIG. 1 and/or client 201 of FIG. 2.

In some embodiments, application health monitoring service 301 includes multiple processing modules for performing one or more different tasks associated with collecting usage data from remote clients. In various embodiments, one or more of the modules shown may not exist and/or additional modules may exist. In some embodiments, the functionality of one or more of the modules may be merged into a single module or split out across multiple different modules. In the example shown, application health monitoring service 301 receives usage data from remote clients via network connection 303 and utilizes network connection 303 to provide configuration information to remote clients. For example, a communication channel is established via network connection 303 with a client to receive usage data collected for the client. Moreover, the communication channel established via network connection 303 with a client can be used to configure application monitoring and data collection for the client, including which applications to collect data for and the type of data to collect.

In some embodiments, data enrichment module 311 is utilized to enrich the incoming usage data. For example, data enrichment module 311 can be used to augment, annotate, and/or add additional detail to usage data collected from the client. In some embodiments, data enrichment module 311 functions to provide location data for the client including network connection data such as a network address and/or geographical data such as the city, sub-region, region, state, and/or locale of the client. In some embodiments, data enrichment module 311 includes additional enrichment functionality such as identifying the geographic location of a client by parameters of the client such as the client's IP address. Other data enrichment can include adding time stamps associated with collected data and calculating latency and throughput metrics for the client connection. In various embodiments, the data enrichment performed by data enrichment module 311 can be based on an identifier of the client such as the client's IP address. Additional metadata not available at the client can be retrieved and/or determined and used to enrich the collected usage data. For example, a client identifier can be used to enrich the client's collected usage data with the available licenses assigned to the user of the client device. In some embodiments, the enriched data is based on aggregated information from multiple clients. For example, the usage data can be enriched based on collected data from across different clients of the same or different region (or sub-region). In various embodiments, once the usage data is enriched, the enriched data is provided to data processing engine 313.

In some embodiments, data processing engine 313 is used to process the incoming usage data including the data enriched by data enrichment module 311. In various embodiments, data processing engine 313 is a streaming engine and can process a continuous stream of input data in real time. For example, data processing engine 313 can utilize a high throughput performance bus for receiving and processing usage data from multiple clients. In various embodiments, the data is processed and written to one or more data stores such as data stores 323. In some embodiments, the processing includes providing the application usage data as raw time-series data and/or rolled-up data. For example, rolled-up usage data can be provided by data processing engine 313 by merging usage data across multiple clients and trimming the merged data to emphasize the most relevant metrics. In some embodiments, the processing performed by data processing engine 313 utilizes additional processing modules such as aggregation module 315 and/or audit module 317.

In some embodiments, data processing engine 313 provides an interactive user-interface such as a web dashboard for viewing the processed application usage data. For example, an IT administrator can access the provided dashboard to view application usage data including raw time-series data as well as rolled up and/or aggregated usage data. In some embodiments, the interactive dashboard allows the viewer to specify which type of data to view and by what categories and/or aggregation parameters, such as by users, by region, by sub-region, by application, by uptime, by usage, by error rate, by resource utilization, etc.

In some embodiments, aggregation module 315 is a processing module for aggregating application usage data across multiple clients. For example, for a particular application and/or application version, usage data can be analyzed to provide aggregated usage results such as the average application uptime for an application, the average number of crashes for an application, and the typical usage time for an application, etc. In various embodiments, the data is aggregated over one or more different windows of time, such as per minute, per day, per week, per month, or another interval of granularity. In some embodiments, the data is aggregated based on geography such as by region, by sub-region, by network location, etc. Other forms of aggregation can be performed as well, such as by user groups, usage metrics, departments, operating system version, application version, etc.

In some embodiments, audit module 317 is a processing module for auditing application usage data. For example, usage data can be audited in reference to determined or configured usage parameters, such as a guaranteed application uptime, quality of service, and/or the number of available purchased licenses. In some embodiments, each application with a guaranteed uptime is analyzed to determine whether the actual use of the application has met uptime expectations. Depending on the audit outcome, one or more actions such as alerts, notifications, and/or requests for a refund or price changes can be initiated. In some embodiments, the use of an application requires a license that is part of a pool of purchased licenses. Audit module 317 can analyze the application usage data to determine whether an organization has purchased the correct or optimal number of licenses. For example, in some scenarios, an organization will have purchased more licenses than are needed and the excess licenses are not utilized. In some embodiments, the excess licenses can be reclaimed and/or returned. As another example, audit module 317 can determine that an organization has not purchased enough licenses for an application such that some users of clients are unable to access the application because no free licenses are available. The audit outcome can identify these deficiencies and initiate actionable resolutions to address them such as by reclaiming unused licenses or initiating purchase recommendations for additional licenses. In some embodiments, the audit outcomes are provided to asset reporting engine 319.

In some embodiments, asset reporting engine 319 is a processing module for reporting asset audit results. For example, asset reporting engine 319 may be used to connect with Software Asset Management (SAM) platforms or other software management services to report discrepancies between actual audit results and expected results. In some embodiments, asset reporting engine 319 is used to initiate the reclamation and/or return of unused or unneeded application licenses. For example, in the event audit module 317 identifies that certain applications have an excess of unused licenses, asset reporting engine 319 can connect with the appropriate SAM platform to initiate the return of the unused licenses. Similarly, in the event more licenses are needed, asset reporting engine 319 can connect with the appropriate SAM platform to purchase additional licenses. In various embodiments, asset reporting engine 319 can also provide the relevant audit information, such as analyzed uptime results, to support the corresponding asset related request. In some embodiments, asset reporting engine 319 is used to generate alerts, notifications, warnings, and/or other reports based on asset audit results.

In some embodiments, client configuration module 321 is a processing module for configuring clients for application monitoring. For example, using client configuration module 321, application health monitoring service 301 can provide a user interface for managing remote clients and the health of their applications. In some embodiments, the configuration settings are stored by client configuration module 321 on one or more data stores of data stores 323. For example, each client can be configured with an inclusion list of applications to monitor and the metrics to collect for the monitored application.

In some embodiments, application health monitoring service 301 stores the usage data including the processed and analyzed results in one or more data stores of data stores 323. In some embodiments, data stores 323 are remote databases and can include one or more distributed databases and/or one or more time series databases. In various embodiments, application health monitoring service 301 further stores configuration and management settings for clients in data stores 323.

Figure 4:
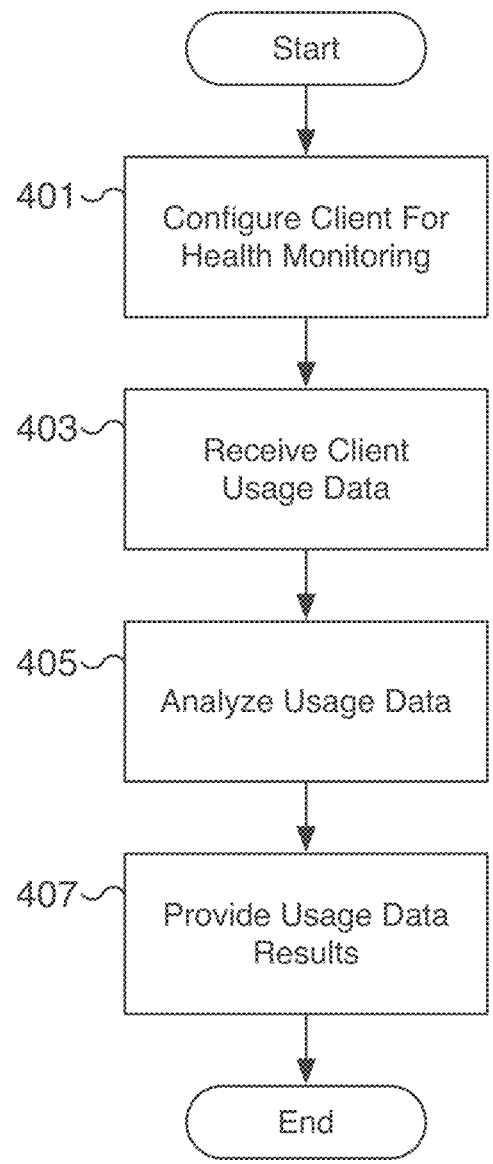
FIG. 4 is a flow chart illustrating an embodiment of a process for monitoring the health of client applications.

FIG. 4 is a flow chart illustrating an embodiment of a process for monitoring the health of client applications. For example, using the process of FIG. 4, one or more clients can be configured for application health monitoring via an application health monitoring service. In some embodiments, the application health monitoring service is used to configure which applications to monitor and collect usage data for. As the application usage data is collected at the client and provided to the application health monitoring service, the application health monitoring service can analyze the provided usage data including performing data enrichment, aggregation, and auditing. In various embodiments, the application health monitoring service provides the analyzed usage data as application usage metrics via an interactive user interface dashboard. In some embodiments, the application health monitoring service is application health monitoring service 111 of FIG. 1 and/or application health monitoring service 301 of FIG. 3. In some embodiments, the client device is client 101, 103, and/or 105 of FIG. 1 and/or client 201 of FIG. 2.

At 401, a client is configured for application health monitoring. In some embodiments, a list of applications to monitor, such as via a list of application names, web sites, and/or domains, is provided by an IT administrator and only the configured applications have their associated usage data collected. For example, an IT administrator can configure an inclusion list of applications for which to collect usage data from and the types of usage data to collect. Examples of usage data configured for collection can include data related to application availability, response time, usage time including total usage time, DNS lookup time, failed request data, total session time, page views, load times including page load times, response times, and access times including the last access time, among other usage and operations data. In some embodiments, usage data collected for an installed application (as compared to browser-based applications) can further include usage data related to network transfers including incoming and/or outgoing network bytes, CPU usage, memory usage, crashes, error events, restarts, application configurations including versions, applications installed and/or running, application updates, usage including usage based on particular metrics such as by day, version, user, etc., and/or access data including last access time and total access time, among other usage and operations metrics.

In various embodiments, the configuration parameters are provided to the client via an agent and/or browser extension installed on the client which performs the application monitoring and data collection. In some embodiments, the agent is application health monitoring agent 251 of FIG. 2 and the browser extension is browser monitoring extension 221 of FIG. 2. For example, once the configuration is provided by an administrator to the application health monitoring service, the application health monitoring service can provide the client configuration to the appropriate client via a network channel established with the application health monitoring agent installed on the client device. In some embodiments, the application health monitoring agent then communicates with the browser monitoring extension to configure the browser extension for monitoring browser-based applications.

At 403, client usage data is received. For example, application usage data collected at the client is received. In some embodiments, the data is streamed to the application health monitoring service via an application health monitoring agent installed on the client. The received streamed data can correspond to application data from multiple clients and can be processed via a high throughput performance bus for receiving and processing usage data from multiple clients.

At 405, usage data is analyzed. For example, the usage data can be analyzed by enriching the data with additional information based on the client and/or collection process. In some embodiments, the usage data is analyzed by aggregating the data collected across multiple clients including by aggregating the data based on categories such as different time periods, user groups, locations or regions, availability, etc. In various embodiments, the usage data is further analyzed by auditing the data to identify whether the usage meets expected constraints such as the number of available licenses and/or application uptime requirements. The analyzed data can be provided as aggregated data, as raw time-series data, as rolled up data, and/or via another form of analyzed data results. In various embodiments, the usage data is analyzed to identify degradations in quality of service, outages of services, and/or another specific pattern such as a pattern related to a region based on aggregated data at the sub-region level.

At 407, usage data results are provided. For example, the usage data results can be provided as an interactive user interface dashboard, for example, to review and identify application usage trends including performance and availability trends. As another example, the usage data can be provided as notification and/or as an audit report to identify deficiencies in application performance including under and over subscription of licenses, degradations in quality of service, and/or outages of services. For example, the usage data can be used to reclaim and/or return unused licenses or purchase additional needed licenses. In some embodiments, the usage data is provided to a software asset management platform to validate usage and performance properties of the monitored applications, such as the usage of licenses and application uptime.

Figure 5:
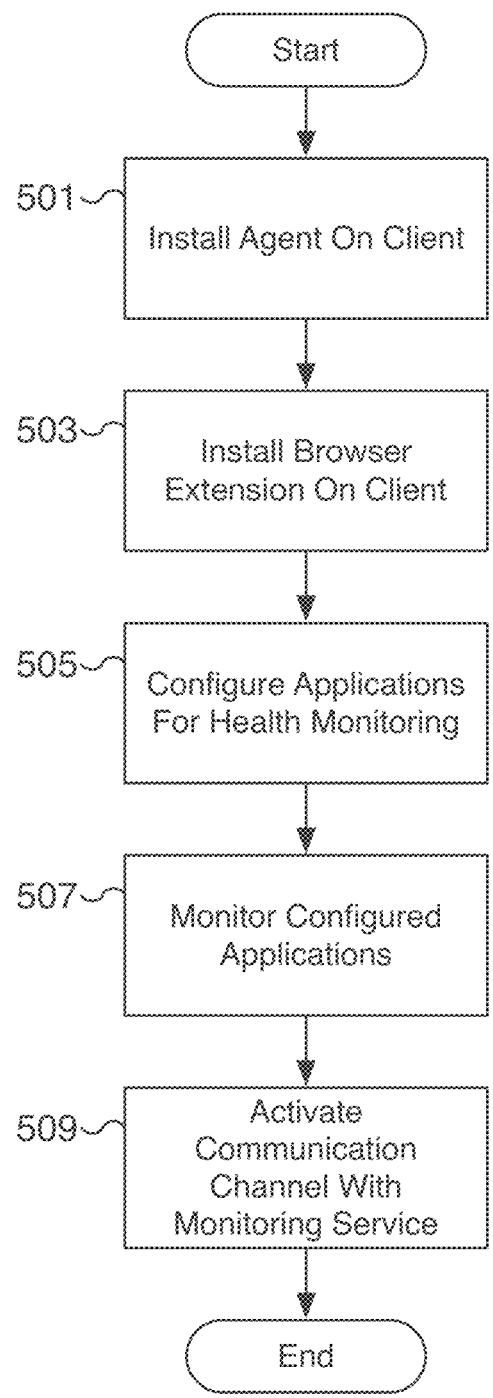
FIG. 5 is a flow chart illustrating an embodiment of a process for configuring a client for application health monitoring.

FIG. 5 is a flow chart illustrating an embodiment of a process for configuring a client for application health monitoring. For example, using the process of FIG. 5, one or more clients can be configured for application health monitoring via an application health monitoring service. In some embodiments, the application health monitoring service is used to configure the client including initiating the installation of an application health monitoring agent and/or a browser monitoring extension on the client to collect application usage data. In some embodiments, the process of FIG. 5 is performed at 401 of FIG. 4. In some embodiments, the application health monitoring service is application health monitoring service 111 of FIG. 1 and/or application health monitoring service 301 of FIG. 3. In some embodiments, the client device is client 101, 103, and/or 105 of FIG. 1 and/or client 201 of FIG. 2.

At 501, an application health monitoring agent is installed on the client. For example, a software application health monitoring agent is installed on the client with access privileges that allow the agent to both monitor applications that are running on the client as well as to retrieve client device information. The agent is further configured with access privileges to establish and/or accept a network connection between the agent on the client and the cloud-based application health monitoring service. For example, the installed agent can collect application usage metrics and provide them via a network connection to a cloud-based application health monitoring service. In some embodiments, the installed agent communicates with one or more browser monitoring extensions to relay additional data collected by the browser extensions to the cloud-based application health monitoring service. The installed agent can also be utilized for updating application monitoring configuration parameters including the configuration of browser monitoring extensions. In some embodiments, the application health monitoring agent is application health monitoring agent 251 of FIG. 2.

At 503, a browser monitoring extension is installed on the client. For example, a browser monitoring extension (or browser plug-in) is installed on the client and integrated with the client's browser software. The browser monitoring extension is configured to allow the browser monitoring extension to monitor browser-based applications that are accessed via the client's web browser. For example, the browser monitoring extension can monitor the web sites and/or web applications that are accessed via the browser from the client and collect usage metrics such as response time, session time, page views, and page load time, among other metrics. In some embodiments, one or more different browser monitoring extensions are installed for each different browser configured for the client. For example, a different instance or version of a browser monitoring extension can be installed and/or customized for different web browsers. In some embodiments, the installed browser monitoring extension communicates with the client agent installed on 501, for example, to receive configuration updates and/or to relay collected application usage data. In some embodiments, the browser monitoring extension is browser monitoring extension 221 of FIG. 2.

At 505, applications are configured for health monitoring. For example, a list of applications to monitor and to collect usage data for are provided, for example, by an IT administrator. The list of applications can specify whether the application is an installed application that is executed natively on the client or a web-based or Software-as-a-Service (SaaS) application that is accessed via the client browser. In various embodiments, the configured applications can be specified by application name, web site, domain name, domain wildcards, or another identification format. In some embodiments, the applications monitored are based on an inclusion list and an application must be added to the inclusion list in order for its usage to be monitored. In some embodiments, a different or default configuration for application monitoring is utilized. For example, default application monitoring settings can be configured during a provisioning step of the client. In various embodiments, configuration for application monitoring can include identifying what usage data and metrics are collected and how they are collected (e.g., parameters related to collection such as frequency, resolution, format, etc.). For example, an IT administrator can specify the application metrics and data to collect as well as the frequency to collect the data. In some embodiments, the configuration parameters are provided and/or managed by an administrator via a cloud-based application health monitoring service and then relayed to the installed agent and/or browser extension. For example, the agent installed at 501 can receive the configuration parameters, update the configuration of the agent, and further provide browser-based configuration parameters to the installed browser monitoring extension for the browser monitoring extension to update its configuration parameters.

At 507, the configured applications are monitored. For example, applications configured for monitoring at 505 are monitored for their usage. In various embodiments, the installed application health monitoring agent and browser monitoring extension each identify when an application that is configured for monitoring is active and initiate the collection of usage data for the running application. For example, the application health monitoring agent can monitor running processes on the client and when a process matches an application configured for application health monitoring, usage metrics associated with the matching application are collected. Similarly, the browser monitoring extension can monitor active web sites accessed via the browser and when a web site matches a web application configured for application health monitoring, usage metrics associated with the matching web application are collected. In some embodiments, the metrics are collected and stored locally until they can be provided to the cloud-based application health monitoring service. In some embodiments, the agent can also collect usage metrics and data as well as receive metrics collected by the browser monitoring extension.

At 509, a communication channel with the monitoring service is activated. For example, a network connection is established between the client and the cloud-based application health monitoring service. In some embodiments, the network connection is established with the installed application health monitoring agent running on the client. For example, the communication channel is established with the installed agent to provide the collected usage data stored at the agent to the cloud-based application health monitoring service. In some embodiments, a communication channel with the monitoring service is additionally activated between the cloud application health monitoring service and the browser monitoring extension. For example, in some embodiments, the browser monitoring extension can provide collected browser application usage data directly to the cloud-based service instead of via the installed agent.

Figure 6:
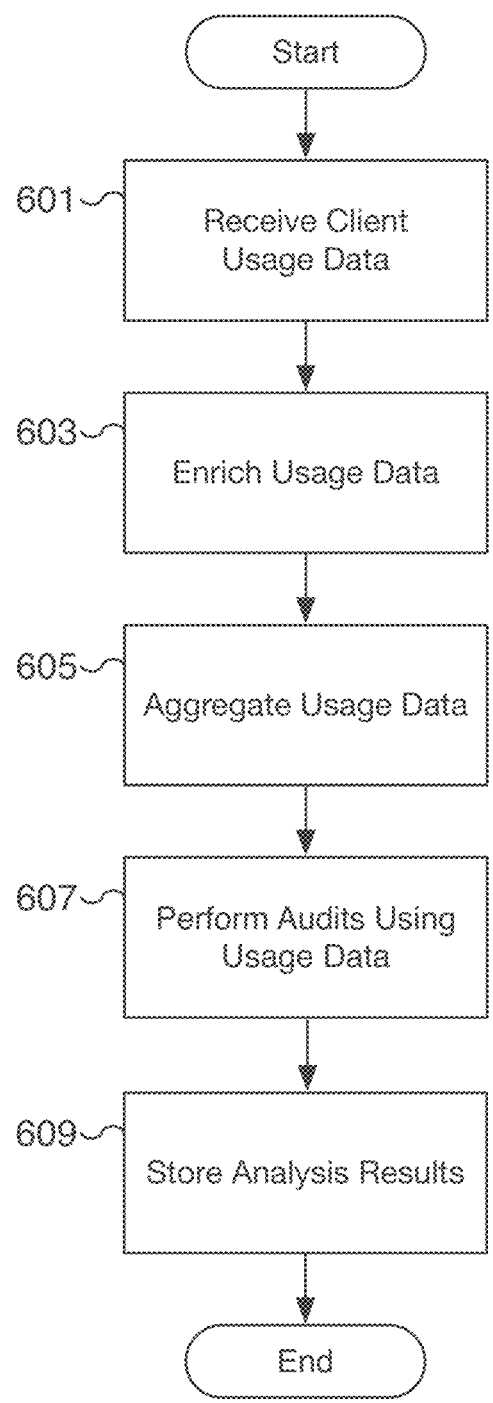
FIG. 6 is a flow chart illustrating an embodiment of a process for analyzing collected application health data.

FIG. 6 is a flow chart illustrating an embodiment of a process for analyzing collected application health data. For example, using the process of FIG. 6, a cloud-based application health monitoring service receives and analyzes application usage data provided by clients to determine application health results. In various embodiments, the received usage data is enriched as part of the analysis process and then further analyzed to provide aggregated and/or audited data results. The analyzed application health results can be provided via an interactive user interface dashboard as well as to initiate software asset management actions such as reclamation of unused licenses. In some embodiments, the process of FIG. 6 is performed by an application health monitoring service at 403 and/or 405 of FIG. 4. In some embodiments, the application health monitoring service is application health monitoring service 111 of FIG. 1 and/or application health monitoring service 301 of FIG. 3. In some embodiments, the client device providing the usage data is client 101, 103, and/or 105 of FIG. 1 and/or client 201 of FIG. 2.

At 601, client usage data is received. For example, usage data collected by a client is provided via an activated communication channel to the application health monitoring service. The received usage data can include application usage data as well as client device data associated with monitored applications. In various embodiments, the usage data is received as a stream of data and processed via a high throughput performance bus. In some embodiments, the data is received from multiple clients including by intermixing the different client data.

At 603, the usage data is enriched. For example, the usage data is enriched with additional relevant data provided by sources other than the client. In some embodiments, the data is enriched based on a client and/or application identifier such as an IP address of the client. For example, based on a client's network address, a location can be determined for the client and the usage data is enriched with location and/or geographic data, such as the client's city, region, state, and/or locale. Other data enrichment can include adding time stamps associated with collected data and calculating latency and throughput metrics for the client connection. Additional metadata not available at the client can be retrieved and/or determined and used to augment, annotate, and/or add additional detail to the collected usage data. For example, a client identifier can be used to enrich the client's collected usage data with the available licenses assigned to the user of the client device. In some embodiments, the enriched data is based on aggregated information from multiple clients. For example, the usage data can be enriched based on collected data from across different clients of the same or different region.

At 605, the usage data is aggregated. For example, the raw data may be aggregated using data received from multiple clients and over multiple usage data updates. For example, for a particular application and/or application version, the usage data can be analyzed to provide aggregated usage results such as the average application uptime for an application, the average number of crashes for an application, and the typical usage time for an application, etc. In various embodiments, the data is aggregated over one or more different windows of time, such as per day, per week, per month, etc. In some embodiments, the data is aggregated based on geography such as by region, by sub-region, by network location, etc. For example, the data can be aggregated based on sub-region to identify patterns for a region. Other forms of aggregation can be performed as well, such as by user groups, usage metrics, departments, operating system version, application version, etc. In some embodiments, the aggregated data results include processing raw data as time-series data to produce rolled-up data results. For example, rolled-up usage data can be provided by merging usage data across multiple clients and trimming the merged data to emphasize the most relevant metrics.

At 607, audits are performed using the usage data. For example, the usage data is audited in reference to one or more determined or configured usage parameters, such as a guaranteed application uptime, guaranteed quality of service, and/or the number of available purchased licenses, among others. For example, the data can be audited to identify usage patterns such as analyzing data aggregated at the sub-region level to identify specific patterns at the regional level. In some embodiments, each application with a guaranteed uptime is analyzed to determine whether the actual use of the application has met uptime expectations. Other forms of audit analysis can be performed as well. For example, for certain applications, the use of the application by a client requires the client to first obtain an application license that is part of a pool of purchased licenses. The audit analysis of the application usage data determines whether an organization has purchased the correct or optimal number of licenses. In some situations, an organization will have purchased more licenses than are needed and the excess licenses are not utilized. The audit analysis identifies these discrepancies. As another example, the audit analysis can also determine that an organization has not purchased enough licenses for a certain application such that some users of clients are unable to access an application because no free licenses are available. The audit outcome can identify these deficiencies.

At 609, the analysis results are stored. For example, the different forms of usage data and the analysis results including application health results are stored in one or more data stores. In some embodiments, the usage data and results are stored and made available for inspection via an interactive user interface dashboard. For example, raw time-series data, rolled-up data, aggregated data, and audited data and corresponding results can be stored and made available for inspection via a dashboard. In some embodiments, the usage data and results are stored for further aggregation once an aggregation parameter is reached. For example, data can be aggregated over a month and the data is stored until at least a month's worth of data is collected.

Figure 7:
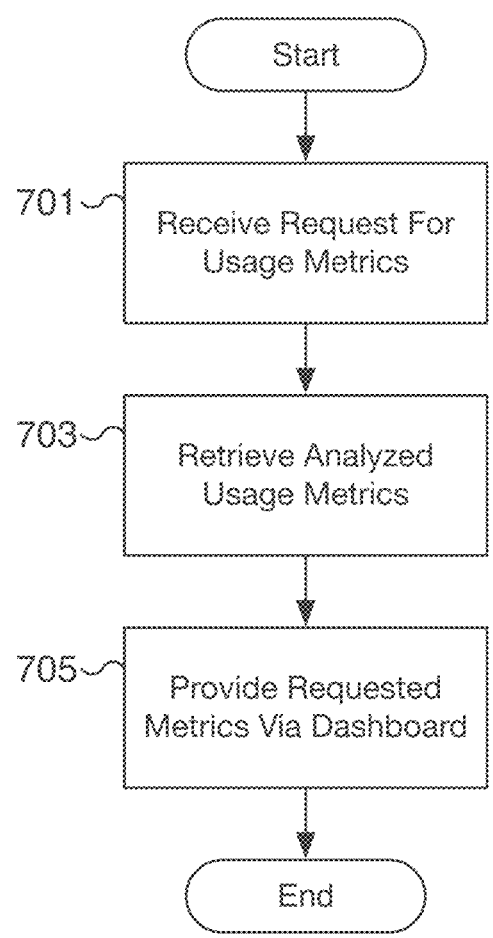
FIG. 7 is a flow chart illustrating an embodiment of a process for providing application health results.

FIG. 7 is a flow chart illustrating an embodiment of a process for providing application health results. For example, using the process of FIG. 7, a cloud-based application health monitoring service provides the results from analyzing application usage data in the form of an interactive user interface dashboard. The provided results can include aggregated and/or rolled application data metrics for applications utilized by clients under the management of the application health monitoring service. In some embodiments, the process of FIG. 7 is performed by an application health monitoring service at 407 of FIG. 4. In some embodiments, the provided usage metrics are processed using the analysis described with respect to the process of FIG. 6. In some embodiments, the application health monitoring service is application health monitoring service 111 of FIG. 1 and/or application health monitoring service 301 of FIG. 3. In some embodiments, the client device providing the usage data is client 101, 103, and/or 105 of FIG. 1 and/or client 201 of FIG. 2.

At 701, a request for application usage metrics is received. For example, a request is provided by a client such as a network client to the application health monitoring service for analyzed application metrics collected from clients under the management of the application health monitoring service. In some embodiments, the request is received via a dashboard provided by the application health monitoring service for interacting with application health metrics. The request may specify the usage metrics to display by configuring the request for specific clients, applications, and/or associated parameters of the clients and/or applications such as location, geography, user group, uptime, usage rate, error rate, resource utilization, update status, license underutilization, license overutilization, etc.

At 703, the analyzed usage metrics are retrieved. For example, the metrics matching the usage metrics requested at 701 are retrieved from one or more cloud-based data stores. In some embodiments, the analyzed metrics are enriched data metrics that include aggregated and/or rolled up data results. For example, the retrieved metrics can include aggregated application usage metrics for a particular time frame. The analyzed metrics can further include audit results such as the results from auditing application usage for uptime guarantees and/or license utilization.

At 705, the requested metrics are provided via a dashboard. For example, based on the request received at 701, the metrics retrieved at 703 are provided via an interactive user interface dashboard. In some embodiments, the dashboard is a web-based graphical user interface and allows the viewer to submit subsequent requests that zoom out or drill-down on the data and/or to modify the request. For example, drilling down on the data can allow the viewer to request more detailed metrics associated with a more refined set of clients, users, locations, and/or applications, etc. In some embodiments, the dashboard also allows the viewer to provide a different time frame for aggregated results as well as to change how the results are aggregated, such as over different factors such as locations, clients, and applications. For example, aggregated monthly results can be drilled down to provide aggregated weekly and daily results. In some embodiments, the information provided regarding audit reports includes the application usage metrics in reference to uptime guarantees and/or the utilization of licenses in reference to purchase licenses. The provided information can also include alerts, warnings, notifications, and/or other messages to alert the user to an identified usage irregularity, such as service outage for a specific application. In some embodiments, one or more of the provided usage metrics can be determined in real-time based on the usage metrics retrieved at 703.

Figure 8:
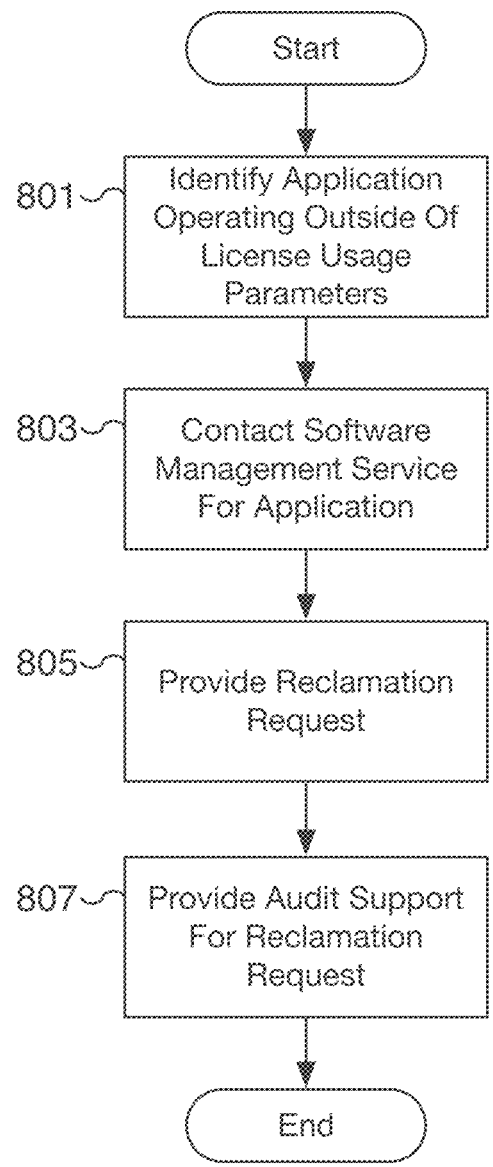
FIG. 8 is a flow chart illustrating an embodiment of a process for identifying and reclaiming unneeded application licenses.

FIG. 8 is a flow chart illustrating an embodiment of a process for identifying and reclaiming unneeded application licenses. For example, using the process of FIG. 8, application license underutilization is identified and the reclamation of unneeded application licenses can be initiated. By auditing the application usage data for license usage, a cloud-based application health monitoring service can initiate the license reclamation process with the application's corresponding software asset management (SAM) service. Although the process is described with respect to licenses, a similar process can be performed with respect to other application metrics such as auditing application uptime with respect to application uptime guarantees or service agreements. In some embodiments, the process of FIG. 8 is performed by an application health monitoring service at 407 of FIG. 4. In some embodiments, the application health monitoring service is application health monitoring service 111 of FIG. 1 and/or application health monitoring service 301 of FIG. 3. In some embodiments, the client device providing the usage data is client 101, 103, and/or 105 of FIG. 1 and/or client 201 of FIG. 2.

At 801, an application operating outside its license usage parameters is identified. For example, an application is configured with license usage parameters that trigger when the application is underutilizing its licenses (i.e., more licenses are available than are needed). In some embodiments, the underutilization event can be triggered using different evaluation techniques, such as triggers based on the number or percentage of unused but available licenses, the amount of time a certain percentage of licenses are utilized, the amount of time a certain number of licenses are available, etc. In various embodiments, the different underutilization scenarios can be configured and used to trigger when an application is operating outside of its license usage parameters. At 801, the application usage data is audited to identify an application that does not meet the configured license usage parameters and the number of licenses that should be reclaimed. In some embodiments, a period of time associated with the license reclamation is also identified. For example, the identified time may be for a period of time in the past and/or for future use of the application.

At 803, the software management service for the application is contacted. For example, a software management service such as a software asset management (SAM) service responsible for managing licenses for the application is identified and contacted. In some embodiments, the connection is established using a well-defined application programming interface (API) or via another established communication protocol.

At 805, a reclamation request is provided. For example, a reclamation request for unused licenses is requested. In some embodiments, the request is based on previous usage history and for licenses that were unused in the past. For example, a reclamation request may be for licenses that were purchased but were unused in the past month. In some embodiments, the request is based on the future expected use of the application where future needs for licenses are based on the past usage of the application. In various embodiments, the reclamation request identifies the application and the number of requested reclaimed licenses.

At 807, audit support for the reclamation request is provided. For example, the software management service contacted at 803 may request support for the reclamation request provided by 805. At 807, the results of the audit analysis performed on the collected client usage data are provided as audit support for the reclamation request. The provided audit support can include time-stamped application usage data collected from monitoring application health. In some embodiments, the audit support includes usage data that is enriched with additional client descriptions such as client user, location, and geography information.

Figure 9:
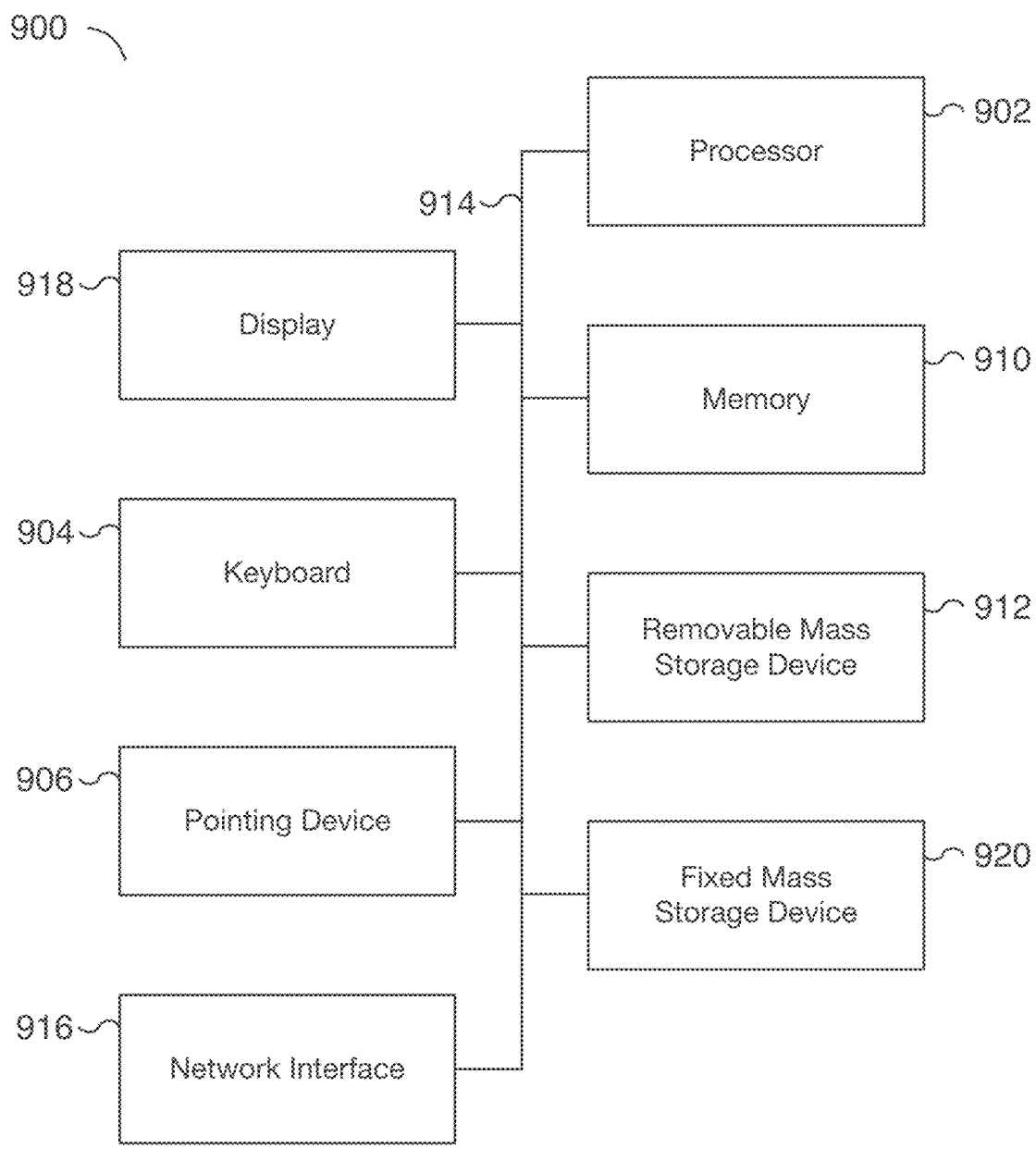
FIG. 9 is a functional diagram illustrating a programmed computer system for monitoring application health.

FIG. 9 is a functional diagram illustrating a programmed computer system for monitoring application health. As will be apparent, other computer system architectures and configurations can be utilized for order-preserving obfuscation of a protected dataset and/or performing comparison queries on the obfuscated data. Examples of computer system 900 include clients 101, 103, and 105 of FIG. 1, client 201 of FIG. 2, one or more computers of application health monitoring service 111 of FIG. 1, and/or one or more computers of application health monitoring service 301 of FIG. 3. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 4-8 and the interactive user interface dashboard of FIGS. 10 and/or 11.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

Figure 10:
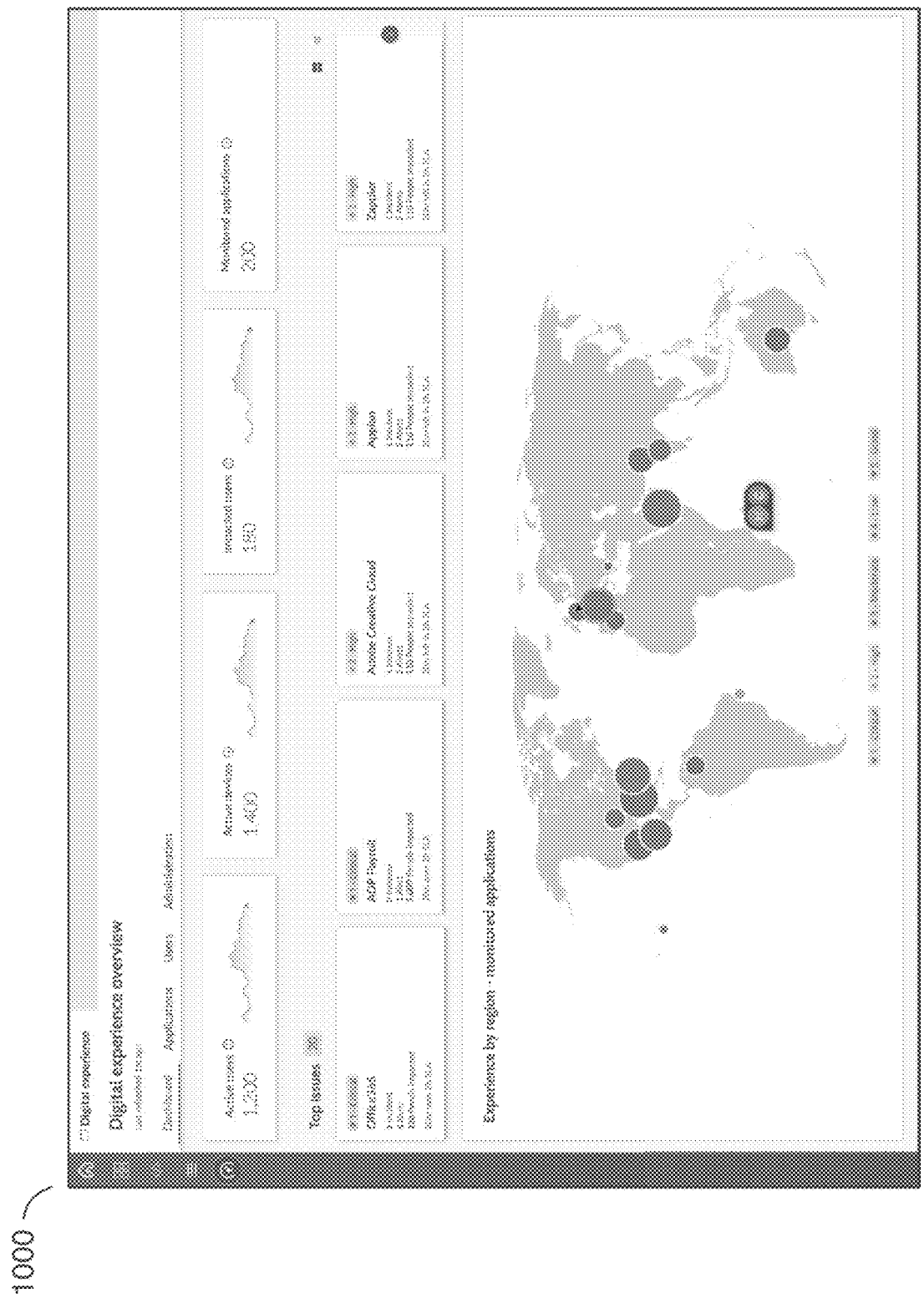
FIG. 10 is a diagram illustrating an embodiment of a user interface for viewing analyzed usage metrics for multiple applications via an interactive user interface dashboard.

FIG. 10 is a diagram illustrating an embodiment of a user interface for viewing analyzed usage metrics for multiple applications via an interactive user interface dashboard. In the example shown, user interface 1000 is a user interface view of an applications health dashboard provided by an application health monitoring service. User interface 1000 includes and displays analyzed application usage metrics including aggregated metrics collected from monitored clients. As shown in FIG. 10, the aggregated application metrics include active users, active devices, impacted users, and monitored applications. The top issues identified from the collected usage data are shown along with the corresponding applications and aggregated details of their corresponding issues. At the bottom of user interface 1000 is a geographic display of applications and their corresponding aggregated user experiences with colors coded for different user client experiences. In some embodiments, user interface 1000 is provided by an application health monitoring service such as an application health monitoring service 111 of FIG. 1 and/or application health monitoring service 301 of FIG. 3. In some embodiments, the usage data includes data collected from clients such as client 101, 103, and/or 105 of FIG. 1 and/or client 201 of FIG. 2 using the processes of FIGS. 4-8.

Figure 11:
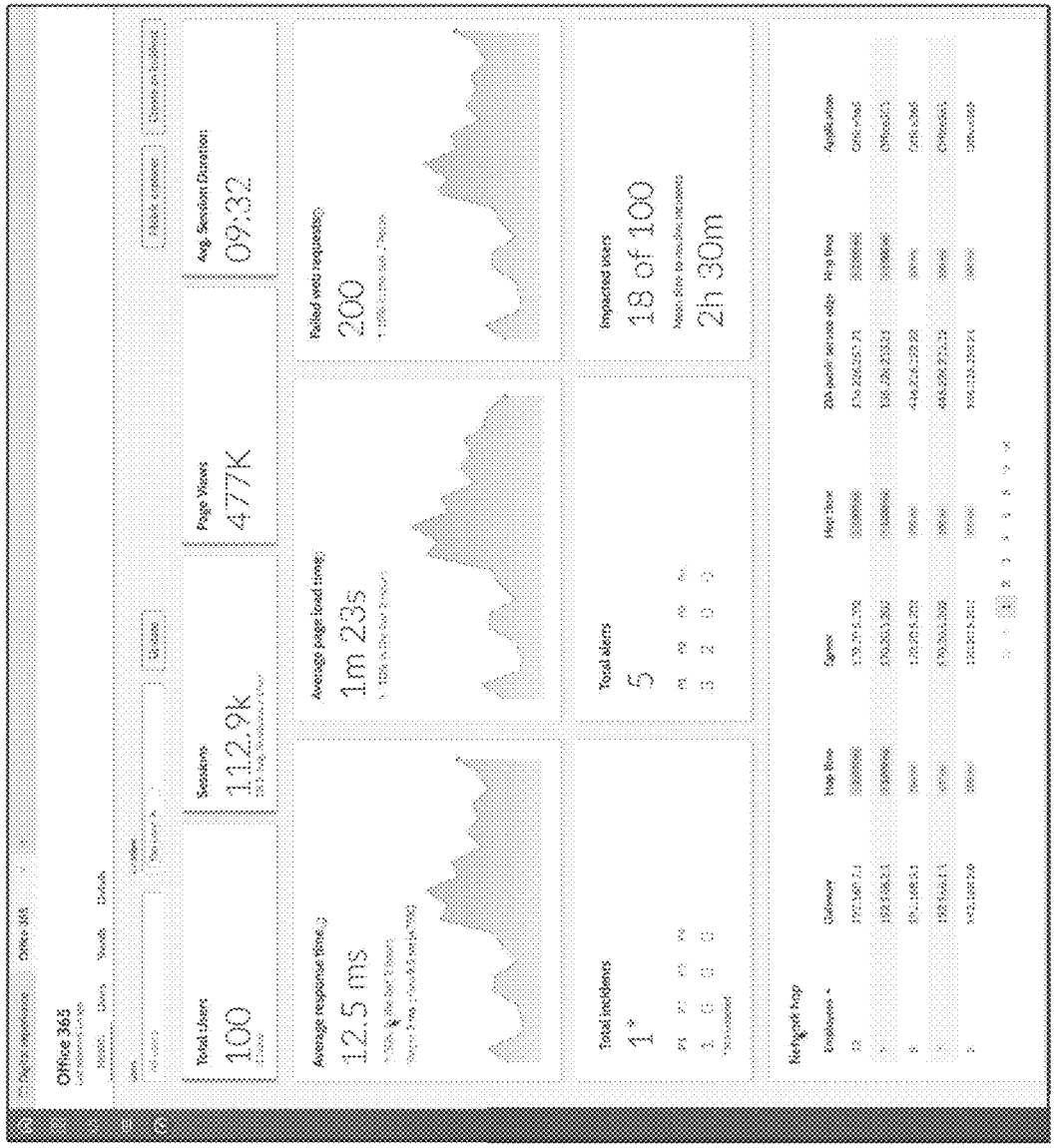
FIG. 11 is a diagram illustrating an embodiment of a user interface for viewing analyzed usage metrics collected from multiple users for a specific application.

FIG. 11 is a diagram illustrating an embodiment of a user interface for viewing analyzed usage metrics collected from multiple users for a specific application. In the example shown, user interface 1100 is a user interface view of an applications health dashboard provided by an application health monitoring service. User interface 1100 includes and displays analyzed application usage metrics including aggregated metrics collected from monitored clients for the Software-as-a-Service (SaaS) application Office 365. As shown in FIG. 11, the aggregated application metrics include total users, sessions, page views, average session duration, average response time, average page load time, failed web requests, total incidents, total alerts, and impacted users. At the bottom of user interface 1100 is a user interface dialog allowing the viewer to browse network information related to different employees who utilized the monitored application. The network information includes enriched usage data such as relevant network addresses and corresponding network hop times. In some embodiments, user interface 1100 is provided by an application health monitoring service such as an application health monitoring service 111 of FIG. 1 and/or application health monitoring service 301 of FIG. 3. In some embodiments, the usage data includes data collected from clients such as client 101, 103, and/or 105 of FIG. 1 and/or client 201 of FIG. 2 using the processes of FIGS. 4-8.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
activating a communication channel with an agent installed on a client;
while the communication channel is active, collecting usage data via the agent, wherein the usage data characterizes usage regarding a plurality of different applications accessed via the client;
analyzing the usage data to determine aggregated numerical metrics respectively associated with the plurality of different applications; and
providing an interactive user interface dashboard providing the determined aggregated numerical metrics categorized separately for each of the plurality of different applications, wherein at least a portion of the plurality of different applications is remotely provided; and
wherein the interactive user interface dashboard includes a geographical graphic including graphical data marker elements representing the aggregated numerical metrics categorized separately for each of the plurality of different applications.

2. The method of claim 1, further comprising providing a reclamation request of one or more licenses to one of the plurality of different applications.

3. The method of claim 1, further comprising determining one or more physical locations associated with the client.

4. The method of claim 1, wherein the collected usage data includes at least one of the following: a response time, a session time, a page load time, or a last access time.

5. The method of claim 1, wherein the determined metrics associated with the plurality of different applications include at least one of the following: a total users metric, a sessions metric, a page views metric, an average session duration metric, an average response time metric, an average page load time metric, or a failed requests metric.

6. The method of claim 1, wherein the collected usage data includes at least one of the following: a CPU usage, a memory usage, an application version, or a last access time.

7. The method of claim 1, wherein the determined metrics associated with the plurality of different applications include at least one of the following: an active users metric, an active devices metric, or a monitored applications metric.

8. The method of claim 1, wherein the determined metrics associated with the plurality of different applications are grouped by geographic region.

9. The method of claim 1, wherein the plurality of different applications includes a combination of one or more user device applications and one or more cloud services.

10. The method of claim 1, wherein each of the plurality of different applications corresponds to a third-party application.

11. A system comprising:
one or more processors; and
a memory coupled to the one or more processors, wherein the memory is configured to provide the one or more processors with instructions which when executed cause the one or more processors to:
activate a communication channel with an agent installed on a client;
while the communication channel is active, collect usage data via the agent, wherein the usage data characterizes usage regarding a plurality of different applications accessed via the client;
analyze the usage data to determine aggregated numerical metrics respectively associated with the plurality of different applications; and
provide an interactive user interface dashboard providing the determined aggregated numerical metrics categorized separately for each of the plurality of different applications, wherein at least a portion of the plurality of different applications is remotely provided; and
wherein the interactive user interface dashboard includes a geographical graphic including graphical data marker elements representing the aggregated numerical metrics categorized separately for each of the plurality of different applications.

12. The system of claim 11, further comprising determining one or more physical locations associated with the client.

13. The system of claim 11, wherein the collected usage data includes at least one of the following: a response time, a session time, a page load time, or a last access time.

14. The system of claim 11, wherein the determined metrics associated with the plurality of different applications include at least one of the following: a total users metric, a sessions metric, a page views metric, an average session duration metric, an average response time metric, an average page load time metric, or a failed requests metric.

15. The system of claim 11, wherein the collected usage data includes at least one of the following: a CPU usage, a memory usage, an application version, or a last access time.

16. The system of claim 11, wherein the determined metrics associated with the plurality of different applications include at least one of the following: an active users metric, an active devices metric, or a monitored applications metric.

17. The system of claim 11, wherein the determined metrics associated with the plurality of different applications are grouped by geographic region.

18. The system of claim 11, wherein the plurality of different applications includes a combination of one or more user device applications and one or more cloud services.

19. The system of claim 11, wherein each of the plurality of different applications corresponds to a third-party application.

20. A computer program product, the computer program product being embodied in a non-transitory computer readable storage medium and comprising computer instructions for:
- activating a communication channel with an agent installed on a client;
- while the communication channel is active, collecting usage data via the agent, wherein the usage data characterizes usage regarding a plurality of different applications accessed via the client;
- analyzing the usage data to determine aggregated numerical metrics respectively associated with the plurality of different applications; and
- providing an interactive user interface dashboard providing the determined aggregated numerical metrics categorized separately for each of the plurality of different applications, wherein at least a portion of the plurality of different applications is remotely provided; and
- wherein the interactive user interface dashboard includes a geographical graphic including graphical data marker elements representing the aggregated numerical metrics categorized separately for each of the plurality of different applications.

* * * * *